(12) United States Patent
Bachman et al.

(10) Patent No.: US 10,045,474 B2
(45) Date of Patent: Aug. 14, 2018

(54) WEIGHT DISTRIBUTION SYSTEM FOR SEED PLANTERS AND PRODUCT APPLICATORS

(71) Applicant: Kinze Manufacturing, Inc., Williamsburg, IA (US)

(72) Inventors: Marvin Bachman, Marengo, IA (US); Dustan Hahn, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 394 days.

(21) Appl. No.: 13/927,177

(22) Filed: Jun. 26, 2013

(65) Prior Publication Data
US 2014/0000919 A1 Jan. 2, 2014

Related U.S. Application Data

(60) Provisional application No. 61/665,357, filed on Jun. 28, 2012.

(51) Int. Cl.
*A01B 63/114* (2006.01)
*A01B 63/24* (2006.01)
*A01B 73/04* (2006.01)
*A01C 7/20* (2006.01)

(52) U.S. Cl.
CPC ............ *A01B 63/24* (2013.01); *A01B 63/114* (2013.01); *A01B 73/044* (2013.01); *A01C 7/205* (2013.01)

(58) Field of Classification Search
CPC . A01B 63/111; A01B 63/114; A01B 63/1145; A01B 73/044; A01B 73/04; A01B 73/02; A01B 61/04; A01B 63/008; A01C 7/203; A01C 7/205
See application file for complete search history.

(56) References Cited

U.S. PATENT DOCUMENTS 3,749,035 A * 7/1973 Cayton et al. ................. 111/187
4,413,685 A * 11/1983 Gremelspacher et al. ... 172/316
4,715,302 A * 12/1987 Briggs ................. A01B 73/044
111/173

(Continued)

FOREIGN PATENT DOCUMENTS

| CL | 2014002374 A1 | 1/2015 |
|---|---|---|
| DE | 102007052353 A1 | 5/2009 |
| GB | 2272353 A | 5/1994 |

*Primary Examiner* — Matthew D. Troutman
(74) *Attorney, Agent, or Firm* — McKee, Voorhees & Sease, PLC

(57) ABSTRACT

An agricultural implement is provided having a tongue, a central toolbar extending from the tongue, and first and second wings extending generally outwardly from the central toolbar. The implement may include a central hopper system to provide the material to individual row units along the central toolbar and wings, or may include individual hoppers located at each of the row units along the toolbars. A weight distribution system is used with the implement to update and adjust the amount of down force applied at the outer toolbars or wings, and the individual row units. The distribution system includes an intelligent control connected to sensors and cylinders. Therefore, the intelligent control receives information from the sensors and adjusts the cylinders accordingly to provide the appropriate amount of down force and to adjust the down force on a real time basis, and can be a closed loop or open loop system.

17 Claims, 13 Drawing Sheets

(56) References Cited

U.S. PATENT DOCUMENTS

| | | | | |
|---|---|---|---|---|
| 5,201,372 A * | 4/1993 | Thompson et al. | | 172/430 |
| 5,234,060 A * | 8/1993 | Carter | | 172/413 |
| 5,358,055 A * | 10/1994 | Long et al. | | 172/470 |
| 5,653,292 A * | 8/1997 | Ptacek et al. | | 172/4 |
| 5,687,798 A | 11/1997 | Henry et al. | | |
| 5,787,825 A * | 8/1998 | Yaji et al. | | 111/174 |
| 5,931,882 A * | 8/1999 | Fick et al. | | 701/50 |
| 6,044,916 A * | 4/2000 | Hundeby | A01C 5/062 | 172/448 |
| 6,085,846 A * | 7/2000 | Buchl et al. | | 172/4 |
| 6,263,977 B1 * | 7/2001 | Mayerle | A01B 63/102 | 172/311 |
| 6,302,220 B1 * | 10/2001 | Mayerle | A01B 63/32 | 172/459 |
| 6,318,477 B1 * | 11/2001 | Bettin | | 172/452 |
| 6,389,999 B1 * | 5/2002 | Duello | | 111/200 |
| 6,675,907 B2 * | 1/2004 | Moser | A01B 73/044 | 111/121 |
| 6,701,857 B1 | 3/2004 | Jensen et al. | | |
| 7,240,626 B2 * | 7/2007 | Wendte et al. | | 111/136 |
| 7,523,710 B2 * | 4/2009 | Wilson | A01C 7/08 | 111/18 |
| 7,726,251 B1 | 6/2010 | Peterson et al. | | |
| 7,918,285 B1 * | 4/2011 | Graham | A01B 63/1006 | 172/2 |
| 7,938,074 B2 * | 5/2011 | Liu | A01C 7/205 | 111/164 |
| 8,176,992 B2 * | 5/2012 | Yuen | A01B 73/048 | 172/311 |
| 8,346,442 B2 * | 1/2013 | Ryder et al. | | 701/50 |
| 8,365,697 B2 | 2/2013 | Cleeves | | |
| 8,380,356 B1 * | 2/2013 | Zielke | A01C 7/205 | 111/34 |
| 8,418,636 B2 | 4/2013 | Liu et al. | | |
| 8,517,118 B2 * | 8/2013 | Remoue | A01B 63/22 | 172/311 |
| 8,522,889 B2 * | 9/2013 | Adams et al. | | 172/4 |
| 8,903,545 B2 * | 12/2014 | Riffel | A01C 7/102 | 700/240 |
| 9,198,343 B2 * | 12/2015 | Mariman | A01B 76/00 | |
| 2002/0017389 A1 * | 2/2002 | Moser | A01B 73/044 | 172/311 |
| 2007/0089653 A1 * | 4/2007 | Wendte et al. | | 111/136 |
| 2010/0180808 A1 * | 7/2010 | Liu | A01C 7/205 | 111/130 |
| 2010/0198529 A1 * | 8/2010 | Sauder et al. | | 702/41 |
| 2011/0313575 A1 * | 12/2011 | Kowalchuk | A01C 7/205 | 700/282 |
| 2012/0048159 A1 * | 3/2012 | Adams et al. | | 111/163 |
| 2012/0125244 A1 * | 5/2012 | Beaujot | | 111/149 |
| 2012/0232691 A1 * | 9/2012 | Green et al. | | 700/231 |
| 2012/0316673 A1 * | 12/2012 | Riffel | A01C 7/102 | 700/240 |
| 2013/0233580 A1 * | 9/2013 | Kinzenbaw | A01B 73/065 | 172/1 |

* cited by examiner

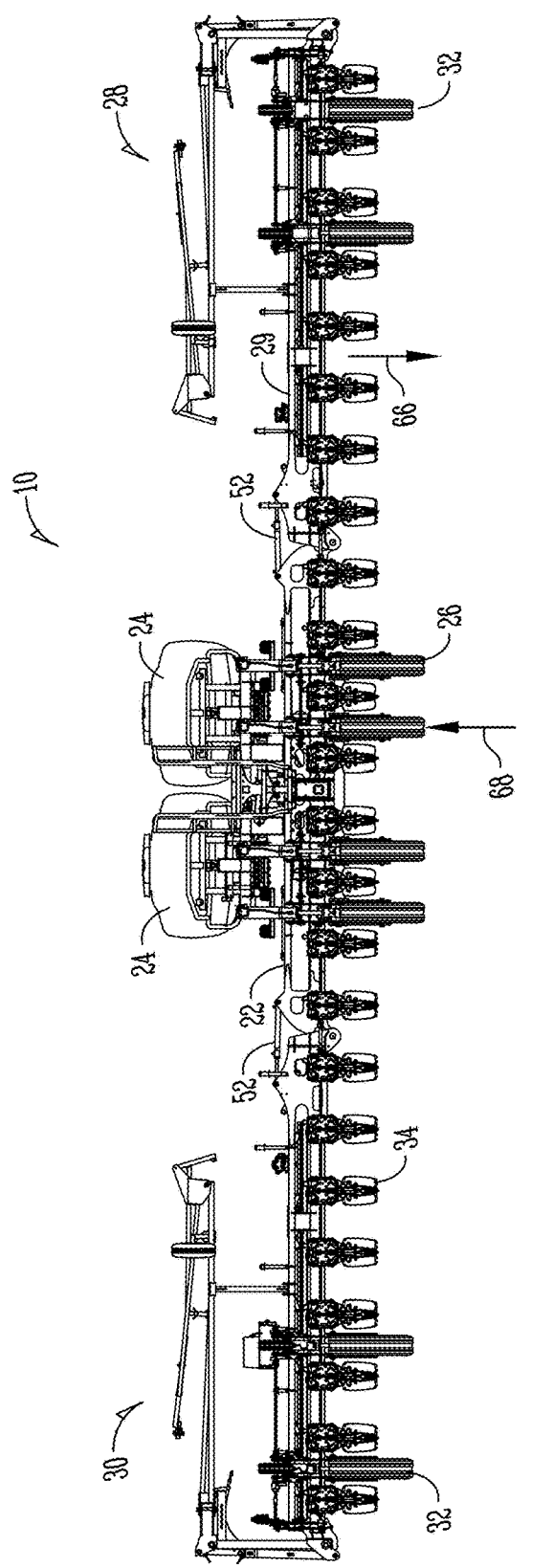

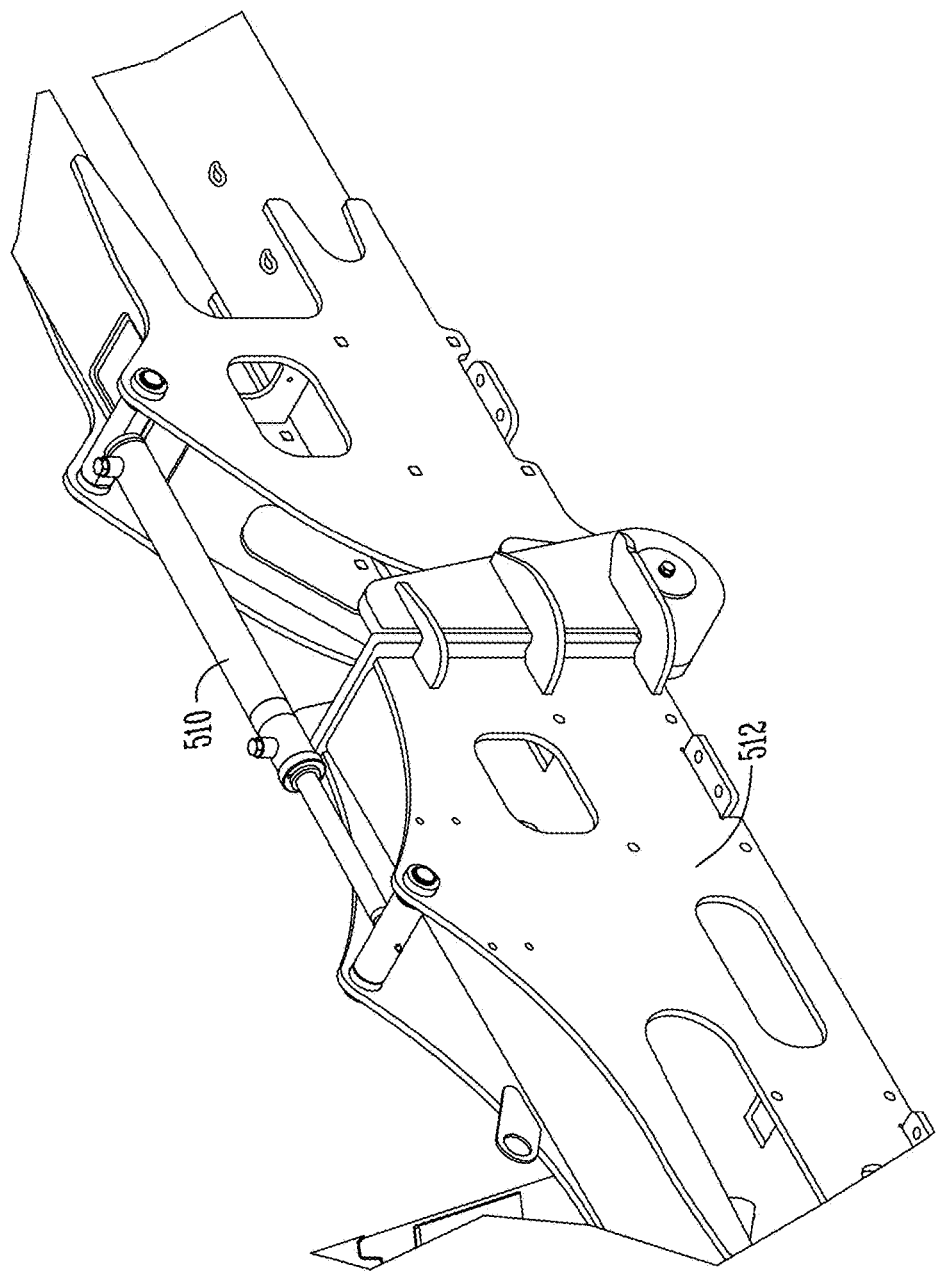

WEIGHT DISTRIBUTION SYSTEM FOR SEED PLANTERS AND PRODUCT APPLICATORS

CROSS-REFERENCE TO RELATED APPLICATIONS

This application claims priority under 35 U.S.C. § 119 to provisional application Ser. No. 61/665,357, filed Jun. 28, 2012, and which is hereby incorporated in its entirety.

FIELD OF THE INVENTION

The present invention relates generally to the field of agricultural equipment. More particularly, but not exclusively, the invention relates to a system for distributing the weight of an implement, such as a planter, during the use of the implement.

BACKGROUND OF THE INVENTION

As the power of tractors and agricultural efficiency has increased, agricultural implements such as planters have increased in span, or width, to accommodate a larger number of individual row units. Planters generally include a main frame having a forward hitch assembly for drawing by a tractor and left and right wing sections pivotally attached to a portion of the main frame. The pivoting wing connections allow the wings to fold relative to the main frame for transport and storage of the planter.

Traditional row crop planters have employed individual seed hoppers affixed to each individual seed-planting row unit. These require filling with seed by hand from bags, or auger or gravity flow from seed unit containers as supplied from a seed company. The process is labor intensive and time consuming, so systems have been devised whereby large centrally located seed hoppers can be bulk-filled with gravity boxes or auger seed tender systems, saving time and reducing labor.

However, the addition of the centrally located seed hoppers has created additional problems. The hoppers have added significant weight (over 5000 lbs.) to center transport axles by moving previously distributed weight to the center of the planter. The additional weight has significantly increased the contact pressure of the main transport tires on the soil, causing compaction, which may result in lower crop yield.

The weight redistribution has also removed approximately 200 lbs. of weight potential from each individual row units. Planter row units require down force to facilitate and maintain soil penetration by their opener blades to open a seed furrow of consistent depth in the soil for planting. With the weight of local seed hoppers now removed, consistency of soil penetration and furrow depth in hard soil, especially in no-till soil is compromised. To help counteract this problem, means of applying spring, pneumatic or hydraulic down force to row units have been employed. The down force has led to yet another problem. The down force has created lift on the tool bar, on which row units are mounted, lowering ground engaging force and tire contact pressure on the ground, which results in slippage of traction-drive tires on the surface of the ground. The change can result in planting skips or inconsistent spacing, which can adversely affect crop yield.

To counter the problems mentioned above, a means to apply down force between the planter center frame and tool bar wings at the contour-following wing flex-points has been employed. The down force has effectively improved both situations, but only for a given load case, as the force applied is constant. As a field may include varying ground hardness and conditions, the amount of down force applied in one area may not be appropriate for other areas. Thus, a field will not be planted consistently, which would affect the overall crop yield for the field.

Therefore, there is a need in the art for a system that can control the amount of down force applied to the central toolbar and wings such that the planting depth will be consistent and soil compaction minimized for varying ground hardness conditions. There is also a need in the art for a system that will automatically update the amount of down force applied at the wings based upon real-time changes of ground hardness in a field.

SUMMARY OF THE INVENTION

It is therefore a primary object, feature, and/or advantage of the present invention to overcome deficiencies in the art.

It is another object, feature, and/or advantage of the present invention to provide a system that will detect the ground hardness to determine the proper amount of down force to apply to planter wings.

It is yet another object, feature, and/or advantage of the present invention to provide a system that will automatically adjust the amount of down force applied to the wings based upon the ground hardness, hopper weight, and/or other factors.

It is another object, feature, and/or advantage of the present invention to provide an open loop control system that allows an operator to adjust the amount of down force applied to the wings based on information obtained by sensors at the toolbars, wings, and row units.

It is still a further object, feature, and/or advantage of the present invention to provide a closed loop control system that varies the down force being applied for purpose of weight distribution between the central section and the outer wing sections of an agricultural implement, based on the ever-changing measured or calculated weight contribution on any or all ground engaging support wheels to spread the load and minimize earth compaction.

It is still a further object, feature, and/or advantage of the present invention to provide a control system to automatically optimize seed placement depth and to minimize field compaction with a system of sensors to measure and balance wheel loading with instantaneous control of hydraulic force of the planter.

These and/or other objects, features, and advantages of the present invention will be apparent to those skilled in the art. The present invention is not to be limited to or by these objects, features and advantages. No single embodiment need provide each and every object, feature, or advantage.

The invention includes a control system that varies the down force being applied for purpose of weight distribution between the central section and the outer wing sections of an agricultural implement, based on the ever-changing measured or calculated weight contribution on any or all ground engaging support wheels to spread the load and minimize earth compaction. The system utilizes weight detection or level-detecting systems to establish the center axle weight contribution of the materials held in centrally located vessels, and will use this along with machine weight information to calculate the appropriate amount of down force or pressure on the outer wings and their support wheels. The system can be open looped, with the operator changing the down force, or closed loop, wherein the system automatically updates the amount of down force based on the information from the one or more sensors of the implement. Alternatively, one could use any combinations of many different level and/or weight detection systems, or a calculated flow-sensor-based mass depletion to include also the weight of on-row-unit seed, fertilizer and insecticide materials and include these in the real time distributed-mass vs. down force calculation.

According to an aspect of the invention, an agricultural implement is provided. The implement includes a tongue having a first end including a hitch, and an opposite second end. A central toolbar is positioned at the second end of the tongue, with the central tool bar including central wheels extending therefrom. Right and left wings extend from opposite sides of the central toolbar, with each of the first and second wings including wing wheels extending therefrom. A weight distribution system is operably connected to the central toolbar, first wing, and second wing. The weight distribution system is configured to adjust down force on the wings to provide ground penetration and to engage row units with the soil, either automatically or by operator input. The system can redistribute the weight of the implement to account for changes in characteristics of the implement (load, location of material, etc.) as well as changes in characteristics of the soil (hardness, wetness, compactiveness, etc.).

According to another aspect of the invention, a weight distribution system for an implement with a plurality of row units positioned at a central frame, left wing, and right wing is provided. The system includes an intelligent control, a plurality of sensors associated with the plurality of row units and connected to the intelligent control, and a plurality of cylinders operatively connected to the intelligent control and the left and right wings. The intelligent control is configured to use information from the sensors to adjust the plurality of cylinders such that the wings receive a down force based on information obtained from one or more of the plurality of sensors.

According to yet another aspect of the invention a method of distributing weight about a central frame, left wing, and right wing of an agricultural implement is provided. The method includes determining one or more characteristics of the implement, ground, or both, with one or more sensors, and adjusting one or more cylinders of the implement to adjust down force at the left wing, right wing, or both, based upon the characteristics determined by the one or more sensors.

BRIEF DESCRIPTION OF THE DRAWINGS

The appended claims set forth those novel features, which characterize the invention. However, the invention itself, as well as further objects and advantages thereof, will best be understood by reference to the following detailed description of an embodiment taken in conjunction with the accompanying drawings, where like reference characters identify like elements throughout the various figures, in which:

FIG. 2 is a rear elevation view of the implement of claim 1;

FIG. 12 is an enlarged perspective view of a cylinder of a weight distribution system according to the invention.

Figure 1A:
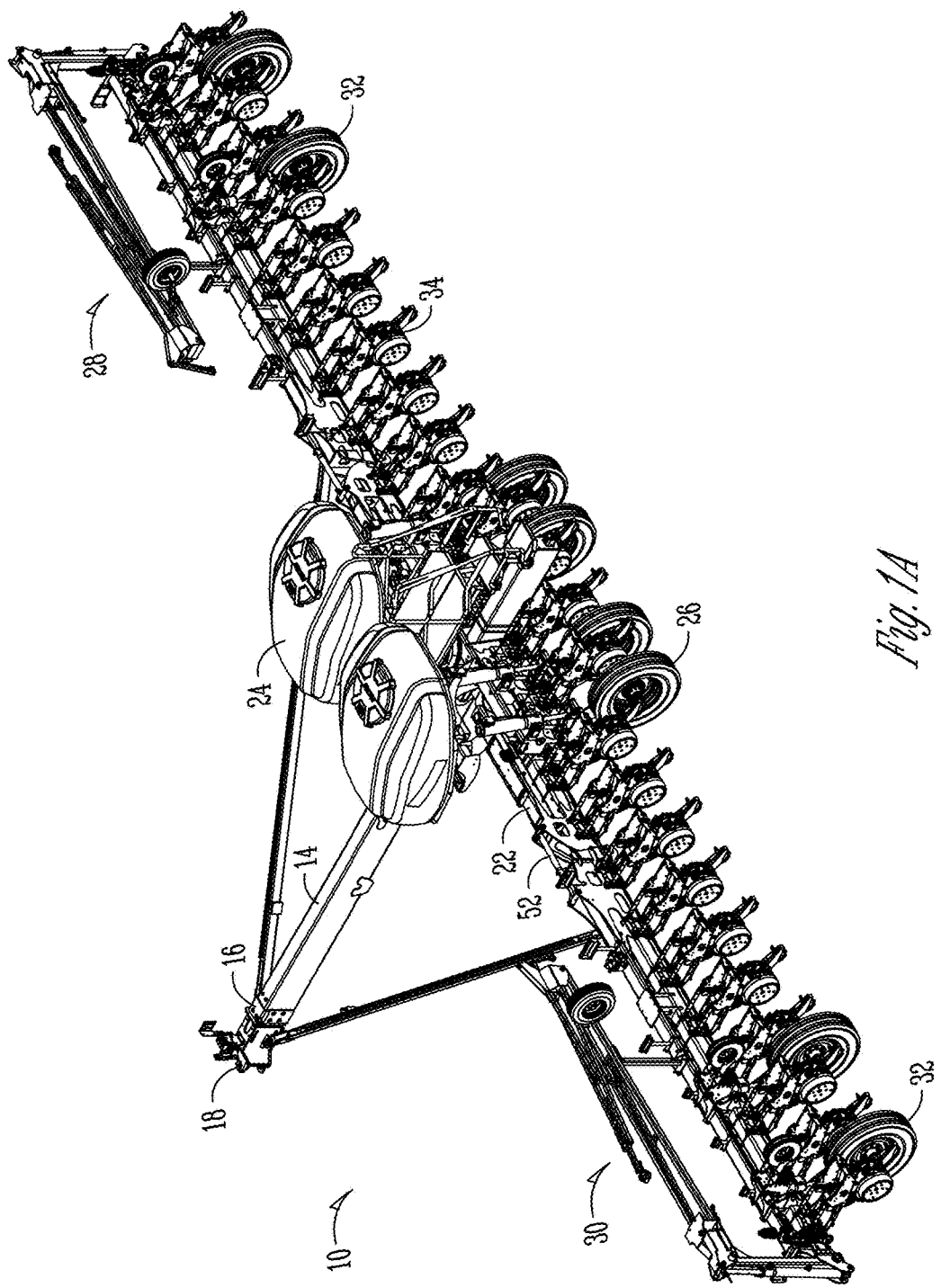
FIGS. 1A and 1B are perspective views of an agricultural implement for use with the system of the present invention.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. In addition, it is understood that the phraseology and terminology used herein is for the purpose of description and should not be regarded as limiting.

DETAILED DESCRIPTION OF THE PREFERRED EMBODIMENTS

The contents of U.S. application Ser. No. 13/458,012, filed Apr. 27, 2012, U.S. application Ser. No. 13/457,815, filed Apr. 27, 2012, and U.S. application Ser. No. 13/457,455, filed Apr. 27, 2012, are all incorporated herein by reference in their entirety.

FIGS. 1A, 1B, and 2-4 show an agricultural implement 10, in this case, a planter for use with a system according to the present invention. The implement 10 may be a planter, fertilizer, or the like, and is usually attached to and pulled by a tractor 12. However, it should be appreciated that other equipment and/or vehicles may move the implement 10. For purposes of the present disclosure, the implement 10 will be referred to as a planter. FIG. 2 shows a rear elevation view of the implement 10.

The implement 10 includes a tongue 14 having a first end 16 and an opposite second end (not shown). The tongue 14 includes a hitch 18 at the first end 16, with the hitch 18 being connected to the tractor 12. At the second end 20 of the tongue 14 is a central tool bar 22. The tongue 14 may be a telescoping tongue with components capable of being inserted into one another such that the implement 10 is a front folding style implement. However, the present invention is not to be limited to such front folding style implements and is to include any such implement for use in the agricultural industry.

Figure 1B:
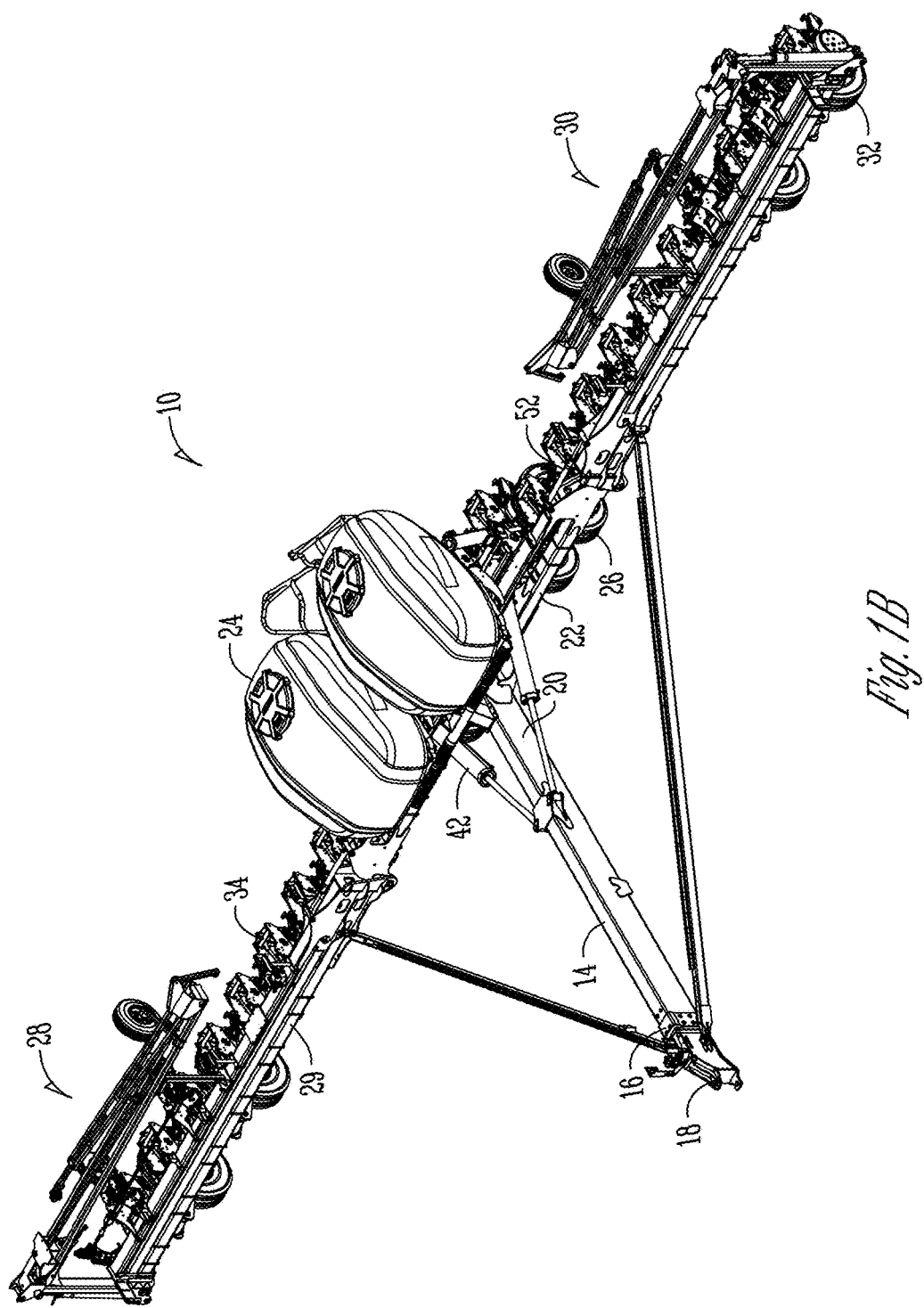

As shown in FIGS. 1A, 1B, and 2, central hoppers 24 are positioned at the central toolbar 22. The hoppers 24 are configured to store seed, fertilizer, insecticide, or other types of material for use in farming. The use of the central hoppers 24 allows for a large amount of material to be added in a centralized location. However, the invention also contemplates the use of multiple hoppers 39 positioned at each of the row units 34, as will be discussed. When central hoppers 24 are used at the central toolbar 22, it should be appreciated that the central hoppers will be in fluid communication with each of the row units 34. Also connected to the central toolbar is a plurality of central wheels 26 extending generally downwardly from the central toolbar 22. The wheels contact the ground and support substantially all of the weight from the central hoppers 24. The wheels stabilize the implement 10 and are the general wheels that contact the ground when in a working position or a transport position, e.g., if the implement 10 is a front folding implement such that the wings 28, 30 are folded forward with wing wheels 32 not contacting the ground.

Extending generally from both sides of the toolbar 22 are first and second wings 28, 30. The wings 28, 30 are generally identical and mirror images of one another. Therefore, only one wing will be described with the knowledge that the other wing will be generally the same configuration. The first wing 28 includes a bar 29. Mounted to the bar 29 are a plurality of row units 34, as well as a plurality of wheels 32. The wheels 32 are configured to contact the ground the majority of the time. The row units 34 may be seeders, fertilizers, insecticide sprayers, or other dispensers, discs, or plows. The wings 28, 30 may also include at least one fold cylinder 42 and a down force cylinder 52. It is further contemplated that multiple down force cylinders be used with an implement having more sections. The fold cylinder(s) 42 is configured to fold the wings from the position shown in FIGS. 1A, 1B, and 2, to a position wherein the first and second wings 28, 30 are generally adjacent the tongue 14 of the implement 10. Therefore, the fold cylinders 42 must be sufficiently strong enough to be able to move the wings.

The down force cylinders 52 provide a force to press the wings downwardly, as shown by the arrow 66, or the cylinders 52 may raise the wings in the direction opposite of the arrow 66 to reduce ground contact pressure. The wings may need to be lifted during turning or during the folding of the wings. However, as the wings extend generally outwardly from the central toolbar 22, the wing down force may be required to ensure that the row units 34 penetrate the ground or remain substantially engaged with the ground.

Figure 3:
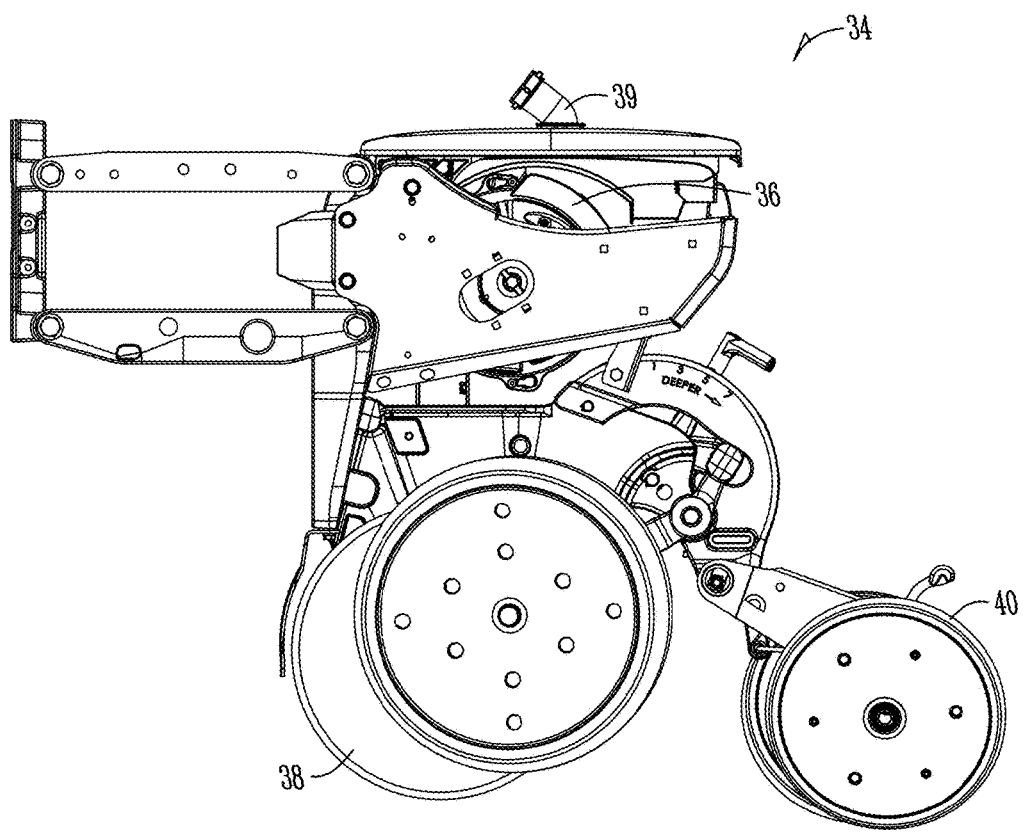
FIG. 3 is a view of a row unit for use with the weight distribution system of the present invention.

FIG. 3 is a view of a row unit 34, and more specifically, a seeder including a seed meter 36 and planter for use with the present invention. The row unit 34 includes a seed meter 36, furrow opener 38, row hoppers 39, and furrow closer 40. In order to have the best crop yield, it is desired that the seeds be planted at generally the same depth, and also the proper depth for the best growing of the crop or plant. The depth of the seed is dependent upon multiple factors, such as soil moisture content, soil temperature, etc., as is described in more detail in U.S. application Ser. No. 13/458,012. The present invention contemplates that the implement 10 and tractor 12 may include the components of the '012 application in order to determine the soil characteristics. Therefore, the plurality of row units 34 should all open a furrow based upon the soil and seed characteristics, which may be approximately the same depth for all of the row units. This will ensure that the seeds are all in the ground at the same depth, no matter what the ground condition. However, as the ground hardness and other conditions change, it may be problematic to obtain this same depth of seed.

As stated above, the cylinders 52 provide a down force for the first and second wings 28, 30. The down force is necessary to press the row units 34 into the ground with the appropriate amount of force to penetrate the ground an approximately desired depth. However, some factors may make this difficult. For example, when the central hopper 24 is full of material, most of the weight of the implement 10 will be focused at that central toolbar 22. Other add-ons such as tanks containing liquid fertilizer or insecticide increase the weight focused on the central toolbar. A sensor, such as a pressure or load sensor, may be placed at the bottom of the hoppers or add-ons to measure the weight of material in the hoppers or add-ons, including the weight of the liquid fertilizer in add-on liquid fertilizer tank. The weight and force felt at the central toolbar may cause the wings to be lifted in an upward manner relative to the central toolbar 22. Therefore, the down force provided by the down force cylinders 52 is adjusted to counteract the weight of the central hopper, other adds-on, and/or hardness of the ground in order to maintain uniform weight distribution across all row units. Additionally, when ground hardness underneath the wing(s) 28, 30 differs from that under the central tool bar 22, an adjustment may be needed to increase or decrease the down force on the respective wing(s) to maintain uniform seed placement depth. In addition, while some implements provide that an operator may adjust the down force, the adjustment of the down force may not be as quickly as needed, as updated as often as required, or changed at all. While the operator is usually in the tractor 12 during use of the implement 10, the operator may not realize the changing conditions in the field.

Figure 4:
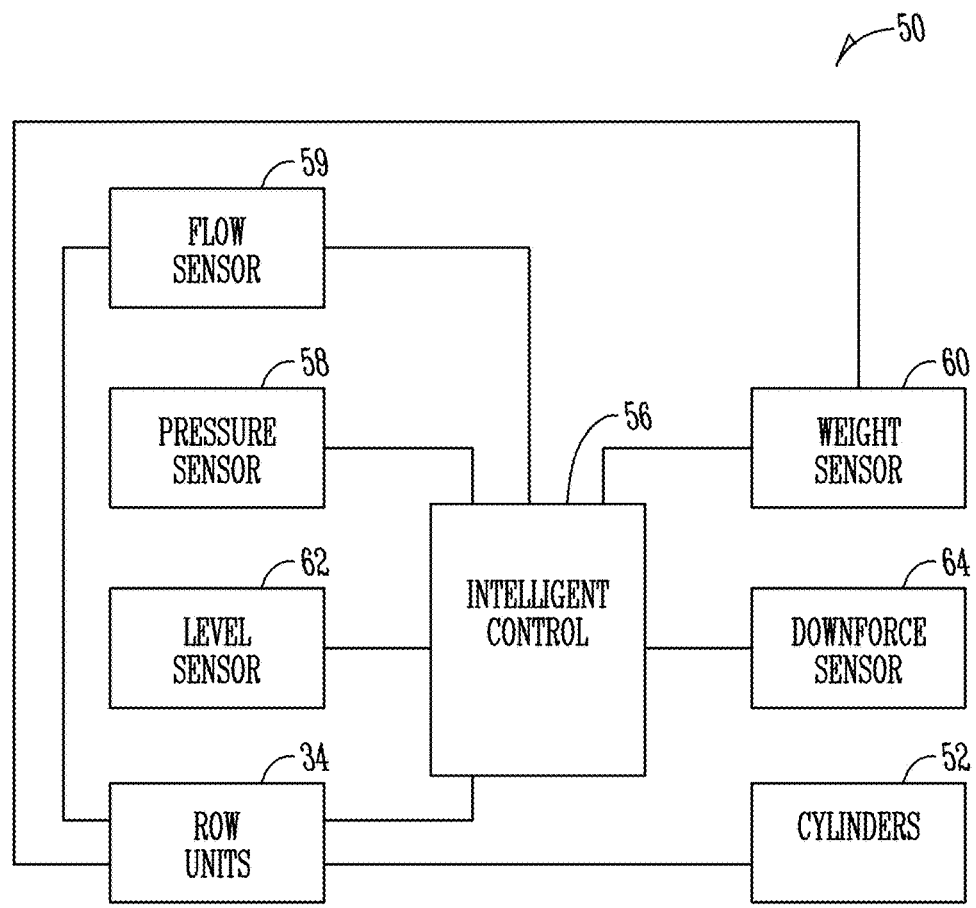
FIG. 4 is a block diagram of a weight distribution system according to the present invention.

Therefore, the present invention includes a weight distribution system 50, as is shown in FIG. 4. The weight distribution system 50 includes an intelligent control 56 positioned at or connected to the implement 10. A plurality of sensors, such as a pressure sensor 58, flow sensor 59, weight sensor 60, level sensor 62, down force sensor 64, accelerometer, liquid sensor, load sensor, and the like, are all electrically or otherwise connected to the intelligent control 56. The sensors may be connected via electrical wires, or also may be connected wirelessly to the intelligent control 56. The intelligent control 56 is also connected to the down force cylinders 52. The intelligent control 56 receives data from the plurality of sensors, and uses that data to adjust the down force provided by the cylinders 52 in order to provide the optimum down force to have the row units 34 penetrate the ground at or close to the desired depth, or at least remain substantially engaged with the ground.

It should also be appreciated that the intelligent control 56 may be located at the tractor, such as with a control system or the like, where the operator can view the data taken by sensors and the amount of down force provided at the wing(s). The intelligent control can be included with a control system as is shown in FIG. 4 of U.S. application Ser. No. 13/457,815, or in another location. The present invention is not to be limited to the exact location of the intelligent control as described in the exemplary embodiments of the present invention. Furthermore, when the system is an open loop system, the operator of the tractor can use the control system to communicate with the intelligent control to adjust the down force at the wing(s).

Figure 5:
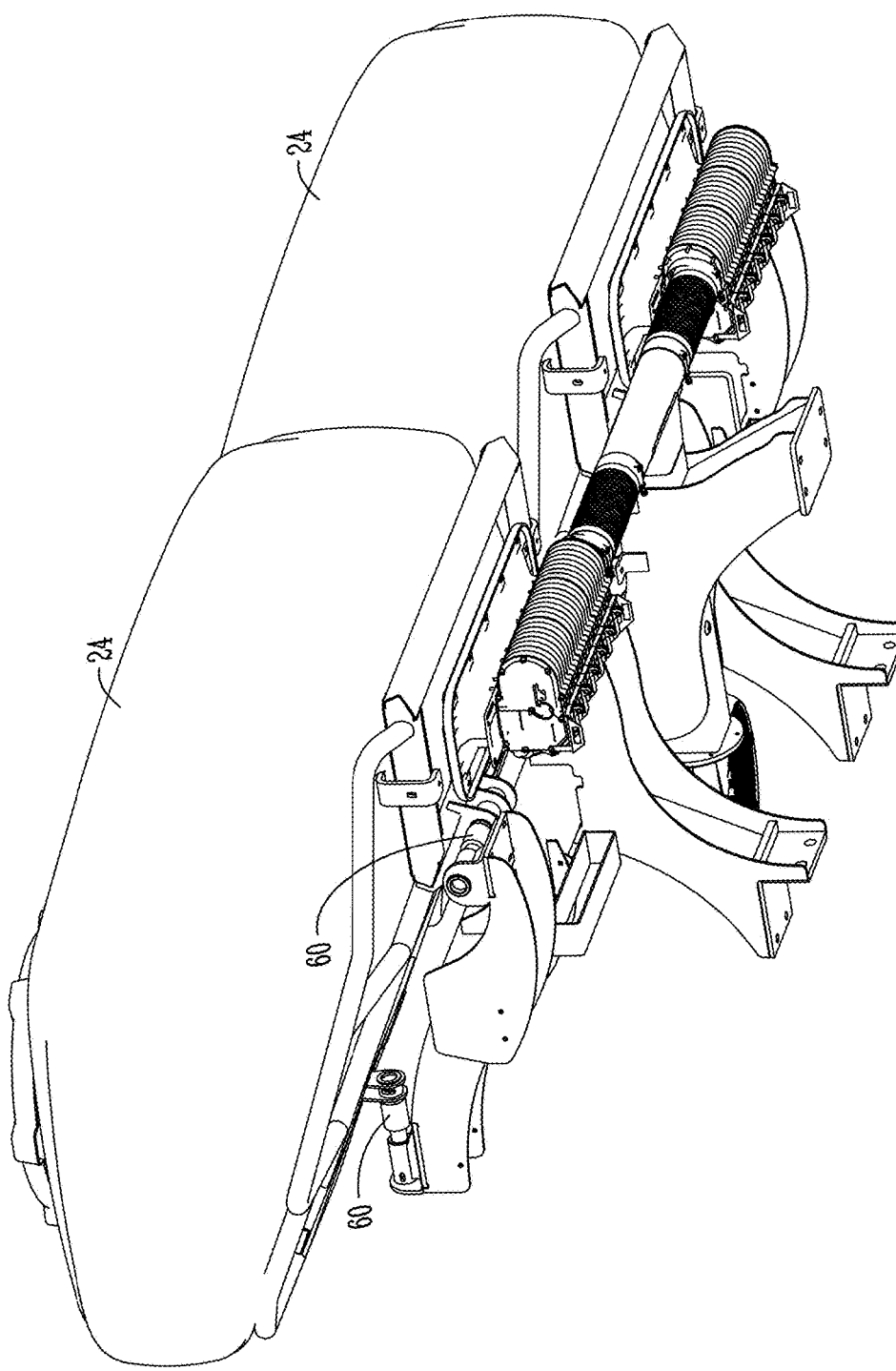
FIG. 5 is a perspective view of a portion of an implement showing sensors positioned adjacent a central hopper of the implement.

In the illustrated exemplary embodiment, the weight distribution system is generally a closed loop control system that varies the down force being applied for purpose of weight distribution between the central section or central toolbar 22 and the outer wings 28, 30 of the implement 10. The down force is changed and updated on a real time basis, based on the ever-changing measured or calculated weight contribution on any or all ground engaging support wheels 26, 32 to spread the load and minimize earth compaction while also providing optimal depth penetration by the row units 34. The sensors 60 determine weight levels of the central hopper(s) 24 or detect the level of the wings via the level sensor 62 of the individual row units 34 to establish the central toolbar 22 weight contribution of the materials held in centrally located vessels, and use this information along with machine weight information to calculate the appropriate amount of down force pressure on the outer wings 28, 30 and their support wheels 32. The sensors 60 may be load cells positioned beneath the hoppers, as is shown in FIG. 5. As shown in the view of FIG. 5, the load cell 60 may be positioned underneath the central hopper(s) to provide an up-to-date weight for the amount of material in the hopper (s). Note also that the load cell shown in FIG. 5 is connected via a wire to an electrical source, which may be at the tractor or the implement, as discussed in U.S. application Ser. Nos. 13/458,012, 13/457,815, and 13/457,577. The load cells are one type of sensor that may be used with the present invention to determine the amount of weight at the central hopper 24. The load cells can be in communication with the intelligent control, as well as a control system within the tractor so that the operator is able to have an updated value for the amount of material in the hopper.

Thus, the intelligent control 56 detects the pressure sensor of the wheels based on the hardness level of the ground, the weight of the row units and central toolbar based on the amount and location of the material of the implement 10, the levelness of the row units on each of the wings 28, 30, as well as the amount of down force currently provided by the cylinder 52, to determine the optimal amount of down force and to automatically adjust this down force on a real time basis as the ground conditions and weight conditions change for the implement 10. The operator will not have to adjust any aspect of their tractor 12 or implement 10, as the system 50 will automatically detect and adjust the cylinders accordingly.

Therefore, the wheels 26, 32 may include load cells at the wheels, wherein the load cells determine the weight acting upon the wheels, as well as the amount of force exerted on the wheels by the ground. The system may be configured to have a predetermined amount of force for ideal planting conditions, and the load cells will be able to determine any variance from that amount of force. The system will be able to adjust the amount of down force based on the variance from the ideal or predetermined amount of force, which could indicate that the row units are not penetrating to the desired depth.

In another exemplary embodiment, the weight distribution is generally an open loop control system that varies the down force being applied for purpose of weight distribution between the central toolbar 22 and the outer wings 28, 30. In the open loop system, the weight distribution system utilizes one or more sensors to sense one or more parameters of the central hoppers 24, row units 34, outboard wheels 32, etc. A processing unit or intelligent control receives the sensed parameter(s) and displays or otherwise outputs information to the user via a user interface, and the user is capable of making a desired adjustment to the weight distribution system using input devices such as, for example, a touch-screen user interface or mechanical control panel.

Figure 6:
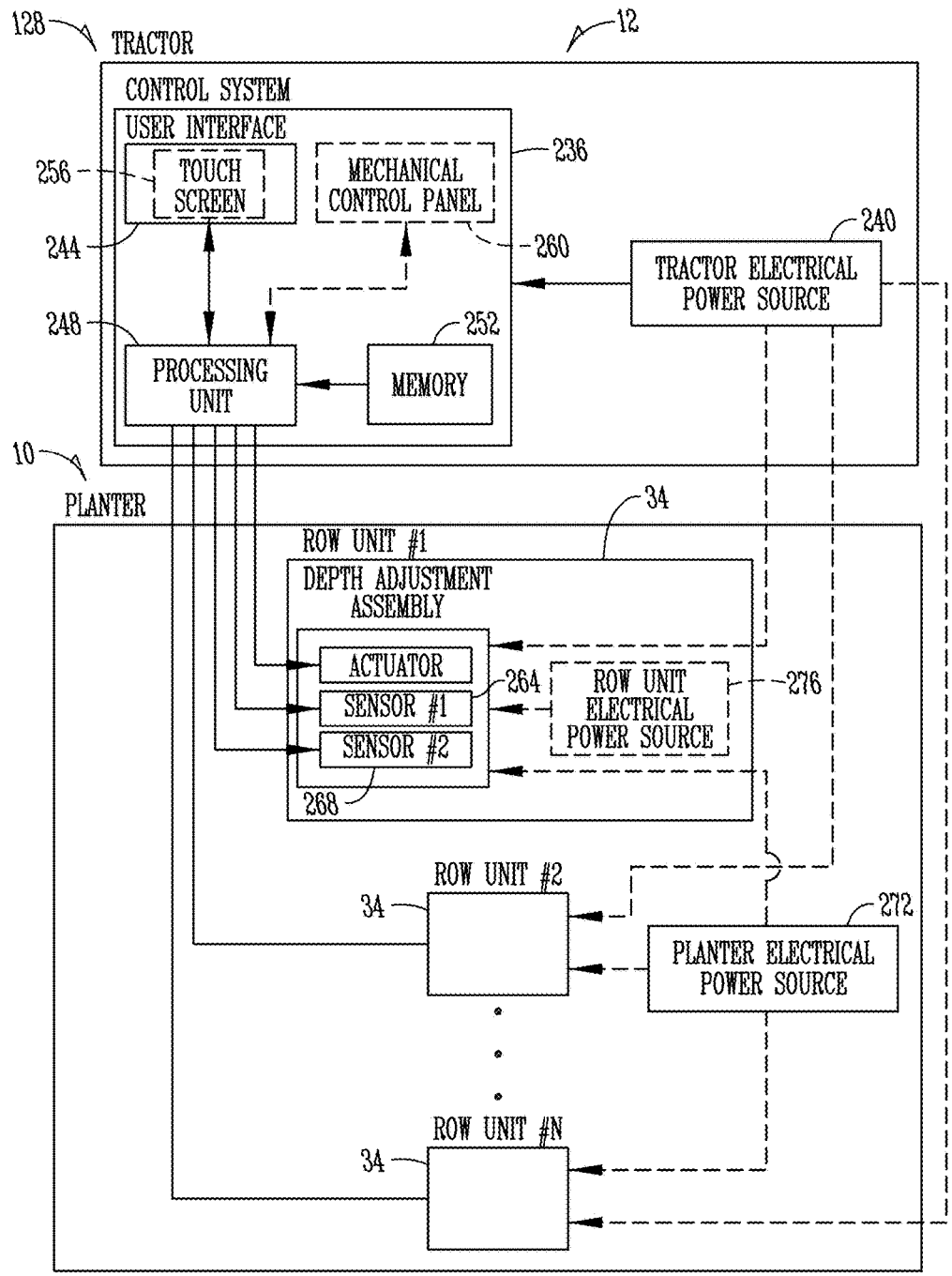
FIG. 6 is a diagram of an exemplary remote depth adjustment system for an implement having a plurality of row units.

An example of a control system for an open loop system is shown in FIG. 6, which shows a user interface, processing unit, and memory. The control system will display the outputs from the plurality of sensors at the locations on the implement, and the operator can selectively adjust the down force for the wing(s) through the user interface. The adjustment can be made based on historical data of the conditions, weight characteristics, sensor outputs, etc., or based upon suggested inputs from the intelligent control. For example, the control system could include alerts or other indicators to let an operator know of changing conditions, upon which the operator can adjust the parameters of the system to account for the changing conditions, e.g., the operator could increase the down force based upon an alert that the ground compaction has changed.

The illustrated exemplary planting depth adjustment system 128 includes a tractor 12 and an agricultural device 10 such as, for example, a planter coupled to and pulled by the tractor 12. The tractor 12 includes a control system 236 and an electrical power source 240 for powering the control system 236. The control system 236 includes a user interface 244, a processing unit 248, and memory 252. In some exemplary embodiments, the user interface 244 may have touch-screen capabilities 256, thereby providing the user with an output display for viewing information and a manner of inputting information via a touch-screen keyboard, buttons, or other touch-screen controls and capabilities. In other exemplary embodiments, the user interface 244 may only be an output device to display information and the control system 236 may include a mechanical control panel 260 including a variety of mechanical switches, buttons, etc. manipulatable by a user to input desired information. In further exemplary embodiments, the control system 236 may include a combination of a touch-screen user interface and a mechanical control panel to output and input desired information. The processing unit 248 performs the necessary processing to achieve the desired functionality of the planting depth adjustment system 128 and communicates with the input devices, output devices, memory, and the agricultural device as necessary to achieve such desired functionality.

With continued reference to FIG. 6, the agricultural device may be a planter 10 and the planter 10 may include a plurality of planter row units 34. The planter 10 may include any number of row units 34, which is exemplified by the annotations: Row Unit #1; Row Unit #2; . . . ; Row Unit #N. As indicated above, the row units 34 may be substantially the same and, therefore, only details of Row Unit #1 are shown in detail. It should be understood that all of the row units 34 may include similar components and functionality to that of Row Unit #1, but such components and functionality will not be presented herein for the sake of brevity. Alternatively, the weight distribution system 50 could use any combination of many different levels and/or weight detection systems, or a calculated flow sensor based mass depletion to include the weight of on row unit seed, fertilizer, and insecticide materials, and include these in the real time distributed mass first down force calculation. This alternative method could be used when the row units include individual hoppers, and are not fed all by the central hoppers 24.

Furthermore, it should be appreciated that the sensors are located at each of the row units 34 or on groups of row units, such that the intelligent control 56 will receive information from each of the row units 34 or row unit groups in order to properly adjust the amount of down force pressure by the cylinders 52. The intelligent control 56 will calculate the information from each of the sensors at each of the row units 34 or row unit groups in order to determine the appropriate amount of down force. Thus, as the implement 10 travels through a field, it does not matter if the field includes both hard and soft ground conditions. The weight distribution system 50 of the present invention will account for any and all changes in the field conditions, including, but not limited to, ground hardness levels, change in level of the field, change in the pitch of the field, change in soil conditions, etc.

Figure 7:
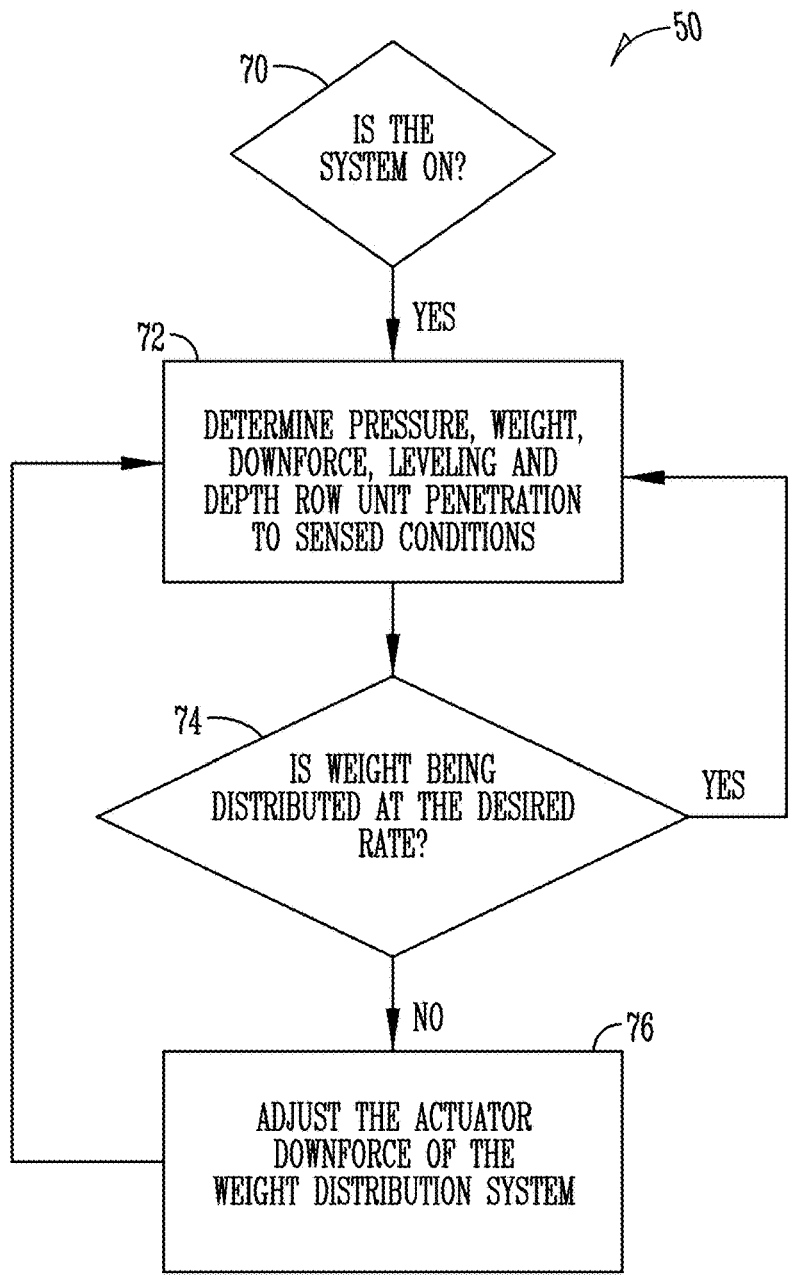
FIG. 7 is a flowchart of the weight distribution system according to the present invention.

FIG. 7 is a flow chart showing one process of an exemplary example of the weight distribution system 50 of the present invention. The first step 70 of the system 50 ensures that the system is on. An operator in a tractor 12 or other vehicle may selectively turn the distribution system on and off. This is important such that the system is not on during transport of the implement from one field to another, from storage to a field, from a field to storage, or the like. The system should only be on when the implement is being used for its intended purpose. However, it should be appreciated that the present invention also includes an additional sensor such that the system 50 automatically detects when to turn on, such as when the operator has activated the implement 10 or begun dispensing material from the implement 10.

Next, the step shown by numeral 72 includes determining the information provided by the sensors. FIG. 4 shows these sensors may include a pressure sensor 58, a weight sensor 60, a level sensor 62, a down force sensor 64, a flow sensor 59, a ground hardness detection sensor, a compaction sensor, or the like. The present invention contemplates that not all sensors mentioned be used with the invention, as well as any other sensors not mentioned may be included as part of the invention.

Once the intelligent control 56 has received the information from the plurality of sensors at the plurality of row units 34, the step shown at box 74 asks if the weight of the system is being distributed among the row units 34 and/or implement 10 at a desired rate. The methods and systems for determining the depth of the furrows, seeds, and row units can be found in U.S. application Ser. Nos. 13/458,012, 13/457,815, and 13/457,577, which are all hereby incorporated in their entirety. Therefore, the system could include sensors, such as optical sensors, ultrasonic sensors, or the like, which can determine the depth of the furrows and seeds. This information can then be sent to the intelligent control and/or control system of the tractor. While the step 74 asks about the distribution of the weight of the implement 10, it should be appreciated that when the implement 10 is a fertilizer applicator, a proximity sensor may detect the distance from the dispenser of the implement to the ground or crop such that the depth becomes asking whether the distance between the dispenser head and the ground or crop is generally the same among the individual row units 34. Additionally, as the implement may be other types of implements, the exact question shown in the box 74 may vary accordingly.

If the answer to the box 74 is yes, the system automatically reverts to determine and receive information from the sensors. At this point, the system re-determines the information from the sensors to determine the pressure, weight, distance, down force, level, and the like. Therefore, the system 50 may be set to be a real time and automatically updating system. If the answer to the box 74 is no, the intelligent control 56 interacts with the down force cylinders 52 to adjust the actuators, which adjusts the distribution of the weight of the implement 10, as is shown in the box 76. For example, if the ground hardness has increased, the intelligent control 56 interacts with the cylinder 52 to redistribute the down force at the wings 28, 30 and row units 34 such that the row units may penetrate the ground with more pressure or less pressure. This may also relieve some of the weight at the central hoppers and/or central row units.

As shown by the arrow leaving the box 76, once the weight has been redistributed, the intelligent control again continues to receive the information from the plurality of sensors to determine the data from the sensors. The process again determines whether this is the appropriate weight distribution based on the information received from the sensors, and adjusts accordingly. This process continues during the entire use of the implement, with the distribution system 50 continually adjusting the weight distribution and down force at the wings and row units as needed. Furthermore, it should be appreciated that the intelligent control is rapidly receiving the sensor information such that the weight distribution and/or down force may be adjusted rapidly (e.g., adjusted every 5 milliseconds or less).

Figure 8:
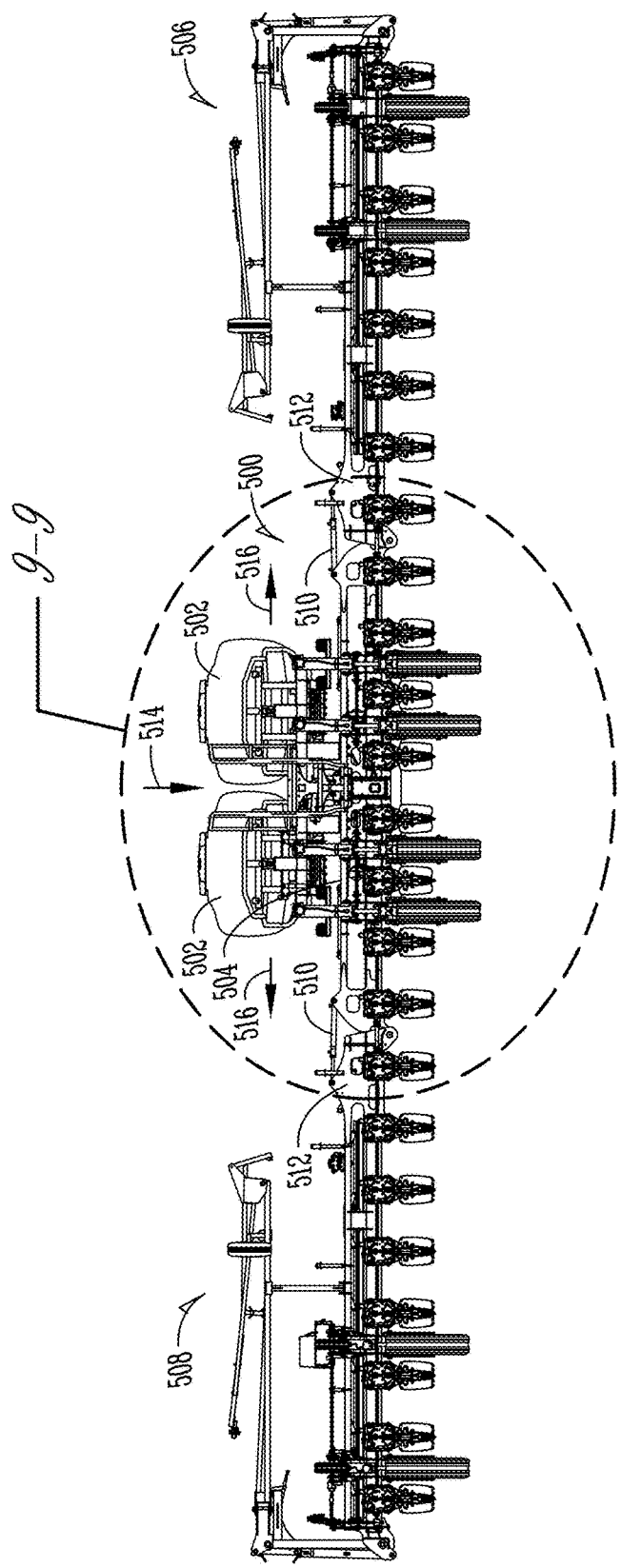
FIG. 8 is a rear view schematic of an embodiment of an implement having a weight distribution system according to the present invention.

FIGS. 8-12 show additional embodiments of a weight transfer system according to the present invention. FIG. 8 is a rear elevation view of a planter 500 with central hoppers 502 positioned at the central toolbar 504. First and second wings 506, 508 extend outwardly from the central toolbar 504. The down force cylinders 510 are pivotally connected between the central toolbar 504 and the wings 506, 508. The cylinders may be electrical cylinders, pneumatic cylinders, hydraulic cylinders, or the like. The cylinders must be powerful enough to provide a down force (both positive and negative) on the wings. The arrow 514 shows the force from the weight of the material in the hoppers. The arrows 516 show that when the cylinders 510 are extended in the direction of the arrows 516, the net result will be a down force on the wings 506, 508, thus providing additional down force to the wings. Alternatively, when the amount of down force needs to be lessened (negative force), the cylinders 510 are retracted in the direction opposite of the arrows 516, which will provide for a lifting force on the wings.

Figure 9:
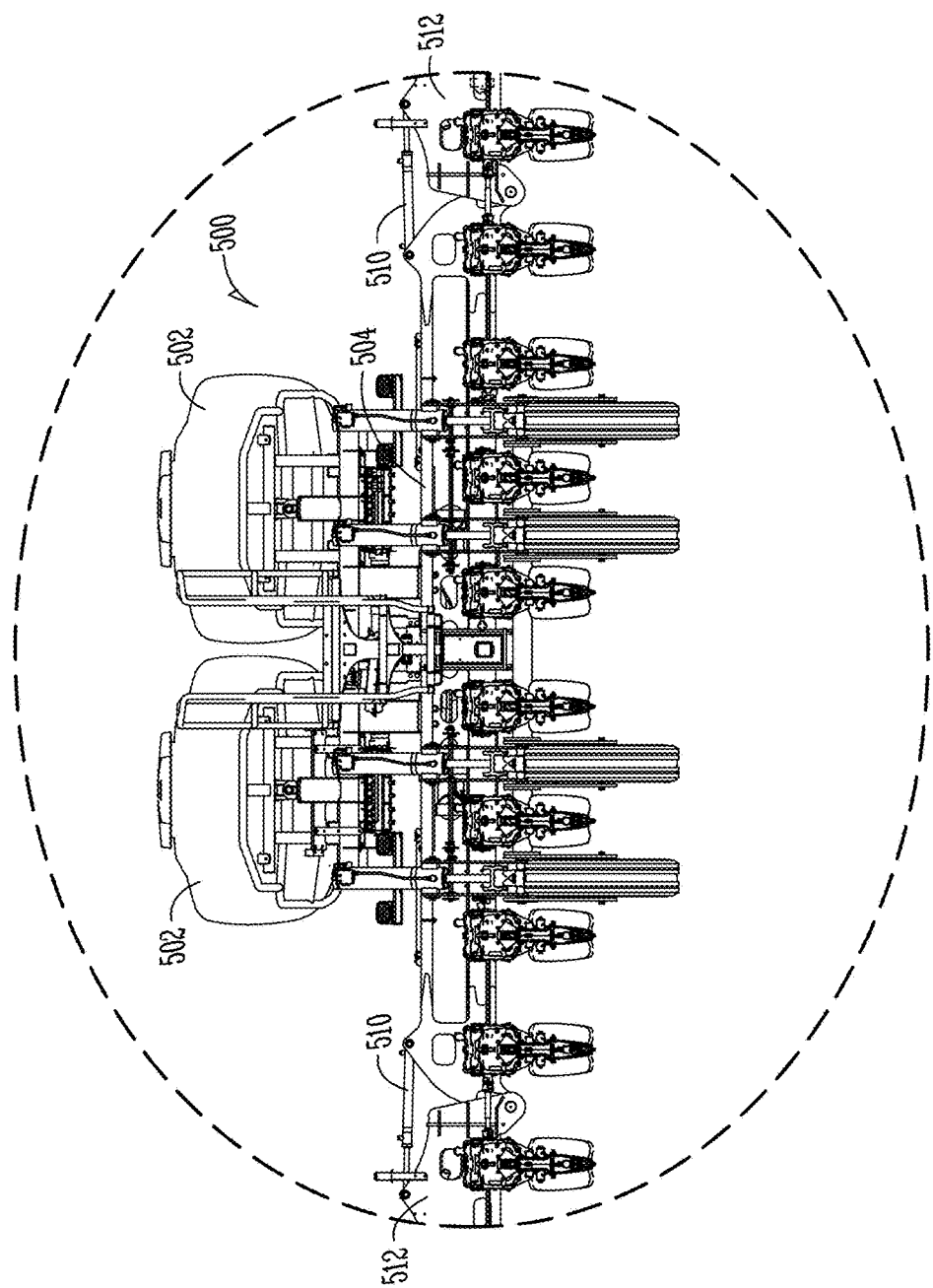
FIG. 9 is an enlarged rear view or a portion of the implement of FIG. 8.

FIG. 9 is an enlarged rear elevation view of the planter 500 of FIG. 8. FIG. 9 shows a close-up of the hoppers 502, while also showing the location of the down force cylinders 510 and arms 512.

Figure 10:
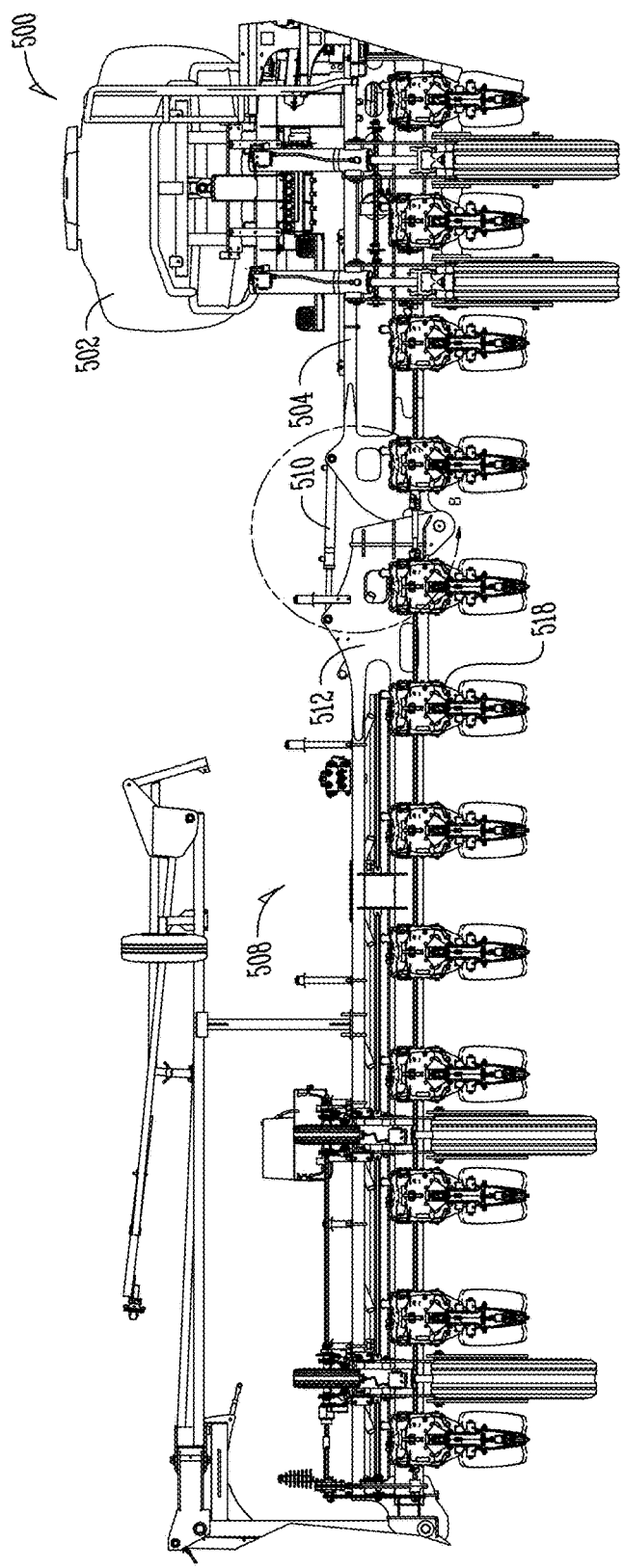
FIG. 10 is an enlarged rear view of one-half of the implement of FIG. 8 having the weight distribution system.

FIG. 10 is an enlarged rear view of the planter 500 of FIG. 8, showing a plurality of row units 518, along with the down force cylinder 510 and arm 512. Similar to the embodiments discussed above, the planter 500 can include either the closed loop or open loop weight distribution system of the present invention. The row units 518 and central hoppers 502 may include a plurality of sensors related to the pressure or weight of the units, soil characteristics, seed depth, furrow depth, compaction, and the like. The sensors are connected to an intelligent control, and also possibly to a control system within a tractor that is pulling the planter. In the closed loop system, the intelligent control receives the information from the plurality of sensors on a real time basis, and automatically adjusts the amount of down force provided by the cylinders 510 to account for the soil characteristics, varying weights of the planter, and seed depth requirements. In the open loop system, the data collected by the sensors is received by the control system, which displays the information to the operator/farmer. The operator is then able to adjust parameters of the control system to adjust the amount of down force on the wing(s) to accommodate the conditions.

Figure 11:
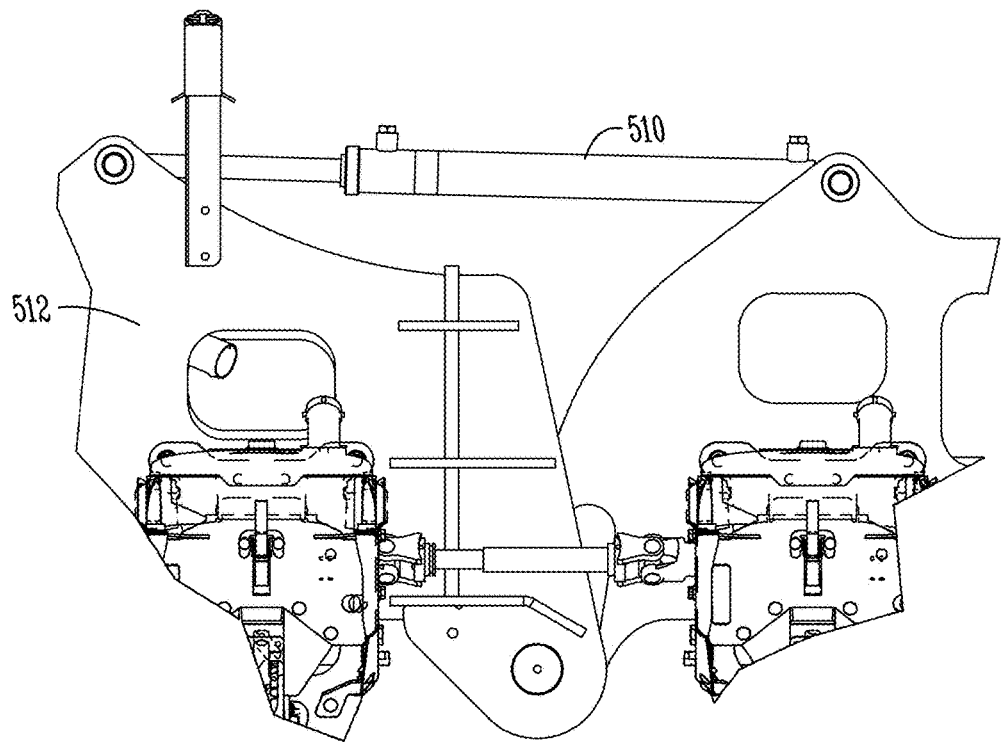
FIG. 11 is another enlarged view of a portion of the implement of FIG. 8.

FIGS. 11 and 12 are additional views of the weight transfer system and weight distribution system of the embodiment heretofore described. Note that the systems may include electrical wires, hydraulic connections, pneumatic connections, and the like to power and control the sensors, cylinders, and components of the systems.

Therefore, a weight distribution system for an implement and method of use has been disclosed. The present invention contemplates numerous variations, options, and alternatives, and is not to be limited to these specific embodiments described herein. For example, the number of sensors and types of sensors may be varied according to the type of implement used. Furthermore, more cylinders may be provided between the central toolbar and wings, and also at the wings, to individually adjust the row units. Therefore, a sensor may be provided between a wing bar 29 and a row unit 34 such that the individual row units may have the down force for said row unit to be adjusted as needed. Other changes are considered to be part of the present invention.

What is claimed is:

1. An agricultural implement, comprising:
   a tongue having a first end including a hitch, and an opposite second end;
   a central toolbar at the second end of the tongue, the central toolbar including central wheels extending therefrom;
   a first wing and a second wing extending from opposite sides of the central toolbar, each of the first wing and the second wing including wing wheels extending therefrom and a fold cylinder configured to fold the wings from a position wherein the wings are generally perpendicular to the tongue to a position wherein the wings are generally adjacent to the tongue;
   a weight distribution system operably connected to the central toolbar, the first wing, and the second wing, the weight distribution system comprising a plurality of sensors and is configured to adjust down force on the first wing and the second wing based, at least in part, on relative loads acting on the central wheels and the wing wheels, and wherein said loads comprise a weight on the implement including the weight of the wings and the ground force on the central and wing wheels;
   a plurality of cylinders operatively connected to the plurality of sensors;
   wherein at least one of the plurality of cylinders operatively connects the central toolbar and the first wing;
   wherein at least one of the plurality of cylinders operatively connects the central toolbar and the second wing; and
   wherein the weight distribution system automatically adjusts the plurality of cylinders based on the plurality of sensors to redistribute the load between the central wheels and the wing wheels.

2. The agricultural implement of claim 1 further comprising a user interface electrically connected to the weight distribution system to display feedback from the system and/or to allow changes to be made to the system.

3. The agricultural implement of claim 1 further comprising a controller operatively connected to the weight distribution system configured to determine the hardness of the ground to adjust the plurality of cylinders.

4. The agricultural implement of claim 3 wherein the plurality of sensors is positioned at the central wheels and the wing wheels.

5. The agricultural implement of claim 4 wherein the plurality of sensors comprises pressure sensors.

6. The agricultural implement of claim 4 wherein the plurality of sensors comprises load sensors.

7. The agricultural implement of claim 4 wherein the weight distribution system further comprises a level sensor.

8. The agricultural implement of claim 4 wherein the weight distribution system further comprises the calculation of flow-sensor-based mass depletion at the wings.

9. The agricultural implement of claim 8 wherein the calculated flow-sensor-based mass depletion comprises weight of on-row-unit seed, fertilizer, or insecticide materials to determine real time distributed mass versus down force calculation.

10. The agricultural implement of claim 1 further comprising a plurality of hoppers positioned at the central toolbar or the first and second wings and wherein the weight on the implement further includes the weight of the plurality of hoppers.

11. The agricultural implement of claim 1 wherein the weight distribution system is a closed loop system, wherein the down force is adjusted automatically.

12. The agricultural implement of claim 1 wherein the weight distribution system is an open loop system, wherein the down force is adjusted manually.

13. The agricultural implement of claim 1 further comprising:
   markers attached to distal ends of the first and second wings, said markers having a marker cylinder capable of folding the markers from a position wherein the markers are adjacent to the wings into a position wherein the markers extend from the wings;
   and wherein the weight on the implement further includes the weight of the markers.

14. A method of distributing weight about a central frame, left wing, and right wing of an agricultural implement, comprising:
   determining one or more characteristics associated with each of the central frame, the left wing and the right wing of the implement with one or more sensors, said one or more characteristics comprising a weight on the implement including the weight of the wings and the ground force on the central and wing wheels; and
   using a controller to actuate one or more cylinders of the implement to independently adjust down force at the left wing, the right wing, or both the left wing and the right wing, based upon the one or more characteristics associated with two or more of the central frame, the left wing, and the right wing;
   wherein at least one of the one or more cylinders is operatively connected between the central frame and the left wing;
   wherein at least one of the one or more cylinders is operatively connected between the central frame and the right wing;
   wherein the wings include fold cylinders configured to fold the wings from a position wherein the wings are generally perpendicular to the tongue to a position wherein the wings are generally adjacent to the tongue.

15. The method of claim 14 further comprising repeating the steps in a closed loop to continually adjust the down force at one or both of the wings.

16. The method of claim 14 further comprising displaying information from the one or more sensors and the one or more cylinders on a user interface to allow manual or automatic adjustment of the down force.

17. The method of claim 14 further comprising determining one or more characteristics associated with ground of a field, and using the controller to actuate the one or more cylinders of the implement based upon the one or more characteristics associated with the ground.

* * * * *